(12) United States Patent
Lee

(10) Patent No.: US 10,436,388 B2
(45) Date of Patent: Oct. 8, 2019

(54) HIGH-PRESSURE CONTAINER HAVING HOOP LAYERS AND HELICAL LAYERS

(71) Applicants: HYUNDAI MOTOR COMPANY, Seoul (KR); KIA MOTORS CORPORATION, Seoul (KR)

(72) Inventor: Dong Sun Lee, Yongin-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 4 days.

(21) Appl. No.: 15/804,827

(22) Filed: Nov. 6, 2017

(65) Prior Publication Data

US 2018/0340655 A1  Nov. 29, 2018

(30) Foreign Application Priority Data

May 26, 2017 (KR) .................. 10-2017-0065247

(51) Int. Cl.
*F17C 1/16* (2006.01)
*F17C 13/00* (2006.01)

(52) U.S. Cl.
CPC .............. *F17C 1/16* (2013.01); *F17C 13/002* (2013.01); *F17C 2201/0109* (2013.01); *F17C 2203/012* (2013.01); *F17C 2203/0604* (2013.01); *F17C 2203/0624* (2013.01); *F17C 2203/0668* (2013.01); *F17C 2203/0675* (2013.01); *F17C 2205/0305* (2013.01); *F17C 2221/012* (2013.01); *F17C 2270/0168* (2013.01)

(58) Field of Classification Search
CPC ............................................. F17C 2209/2154

USPC .................... 220/588, 586, 495.01, 581, 589
See application file for complete search history.

(56) References Cited

U.S. PATENT DOCUMENTS 4,438,858 A * 3/1984 Grover .................. B29C 53/602
                                                        220/590
5,025,943 A * 6/1991 Forsman ............... B29C 53/602
                                                        220/589

(Continued)

FOREIGN PATENT DOCUMENTS

JP         11-101397 A         4/1999
JP       2004-176898 A         6/2004

(Continued)

OTHER PUBLICATIONS

B.W. Tew, Preliminary Design of Tubular Composite Structures Using Netting Theory and Composite Degradation Factors, Nov. 1995, ASME, vol. 117, 390 (Year: 1995).*

*Primary Examiner* — J. Gregory Pickett
*Assistant Examiner* — Tia Cox
(74) *Attorney, Agent, or Firm* — Morgan, Lewis & Bockius LLP

(57) ABSTRACT

A high-pressure container having a liner and a composite layer for reinforcing a perimeter of the liner includes: a cylinder part foiled along the axial direction of the high-pressure container; and dome parts fastened to both ends of the cylinder part to enclose the high-pressure container. The composite layer formed on the cylinder part is formed by a plurality of hoop layers and helical layers overlapped alternately. A hoop layer disposed closer to the liner has a thickness greater than that of a hoop layer disposed farther from the liner so that a thickness of the hoop layers decreases as a distance from the linear increases.

9 Claims, 6 Drawing Sheets

(56) References Cited

U.S. PATENT DOCUMENTS

| | | | | |
|---|---|---|---|---|
| 8,727,174 | B2* | 5/2014 | Otsubo | F17C 13/06 156/188 |
| 8,740,009 | B2* | 6/2014 | Otsuka | F17C 13/06 220/588 |
| 8,783,504 | B2* | 7/2014 | Kleschinski | F17C 1/16 220/590 |
| 9,316,359 | B2* | 4/2016 | Otsuka | B29C 53/602 |
| 2004/0206762 | A1* | 10/2004 | Iida | B29C 53/8016 220/581 |
| 2006/0065664 | A1 | 3/2006 | Ohta et al. | |
| 2006/0096993 | A1* | 5/2006 | Takashima | F17C 1/06 220/588 |
| 2011/0056960 | A1* | 3/2011 | Blanc | B29C 53/602 220/588 |
| 2013/0087567 | A1* | 4/2013 | Kaneko | F17C 1/06 220/590 |

FOREIGN PATENT DOCUMENTS

| | | |
|---|---|---|
| JP | 2005-036918 A | 2/2005 |
| JP | 2012-149739 A | 8/2012 |
| KR | 10-0873295 B1 | 12/2008 |

* cited by examiner

HIGH-PRESSURE CONTAINER HAVING HOOP LAYERS AND HELICAL LAYERS

CROSS-REFERENCE TO RELATED APPLICATIONS

The present application claims the benefit if priority to Korean Patent Application No. 10-2017-0065247, filed May 26, 2017, the entire content of which is incorporated herein for all purposes by this reference.

TECHNICAL FIELD

The present disclosure generally relates to a high-pressure container mounted in a fuel cell system. More particularly, the present disclosure relates to a composite layer disposed on a perimeter of a liner on a high-pressure tank.

BACKGROUND

Generally, a fuel cell system is composed of a fuel cell stack that generates electrical energy, a fuel supply system that supplies fuel (hydrogen) to the fuel cell stack, an air supply system that supplies oxygen from the air to the fuel cell stack as a oxidant needed for the electrochemical reactions, a thermal and water management system that controls the operating temperature of the fuel cell stack, and the like.

A hydrogen tank included in the fuel supply system, i.e. the hydrogen supply, stores compressed hydrogen under a high pressure of about 700 bars, and after this stored compressed hydrogen is discharged to a high-pressure line according to the on/off manipulation of the high-pressure controller mounted at the entrance part of the hydrogen tank, it is decompressed as it passes through the starting valve and the hydrogen supply valve, before it is supplied to the fuel cell stack.

Here, a high-pressure gas is used as fuel (hydrogen), and as such, there is a need for a gas storage container for storing and discharging the gas as needed. In particular, since gases have a low storage density within a container, it is most efficient to store a gas under high pressure, although there is the drawback that the high pressure creates a risk of combustion. In particular, an alternative-fuel gas vehicle has a limited amount of space for a storage container, and as such a key technological element is to keep the storage pressure high while guaranteeing safety.

Therefore, in the case of a composite-material container for storing fuel gas, the outer skin must be reinforced with a fiber-reinforced composite material having high specific strength and high specific stiffness in order to withstand the high internal pressure from the hydrogen gas, and a liner is installed on the inside to maintain airtightness. More specifically, a liner having two semispherical forms at both ends may be attached to form one storage container.

In addition, containers for storing gas, especially hydrogen, may be classified into different types according to the material of the liners, with containers having liners of metallic materials classified as Type 3 and containers having high-density polymer materials classified as Type 4. Type 3 containers are relatively stable but are expensive and have low fatigue resistance, while Type 4 containers are relatively inexpensive and have better fatigue resistance but entail safety-related problems associated with hydrogen leakage, low impermeability, etc.

In particular, high levels of stress occur along the circumferential direction at the cylinder part formed at the center of a high-pressure container. Thus, there is a need for a composite layer structure that winds around the cylinder part of a high-pressure container to withstand the stresses applied thereon, as well as for technological features that allow reduced weight while providing resistance to high levels of stress.

The foregoing is intended merely to aid in the understanding of the background of the present disclosure, and is not intended to mean that the present disclosure falls within the purview of the related art that is already known to those skilled in the art.

SUMMARY

In the case of an existing high-pressure container, the composite material winds at a low angle to form a helical layer at the exterior of the liner around the boss part faulted at either end of the high-pressure container, whereas the composite material winds at a high angle to form a hoop layer at the exterior of the liner around the center portion of the high-pressure container. In this case, however, air pockets may occur at the interface between a hoop layer and a helical layer.

Furthermore, it is difficult to guarantee a constant level of durability in the high-pressure container against stresses applied from various directions. Accordingly, an embodiment of the present disclosure adopts a structure in which multiple numbers of hoop layers and helical layers are arranged in an alternately winding configuration in the cylinder part of the high-pressure container to provide the composite layer in a light weight while increasing durability against stresses applied from different directions.

In order to achieve the objective above, according to one aspect of the present disclosure, there is provided a high-pressure container having a liner and a composite layer for reinforcing a perimeter of the liner, the high-pressure container including: a cylinder part disposed along the axial direction of the high-pressure container; and dome parts fastened to both ends of the cylinder part to enclose the high-pressure container. The composite layer, which is disposed on the cylinder part, includes a plurality of hoop layers and helical layers overlapped alternately A hoop layer disposed closer to the liner has a thickness greater than that of a hoop layer disposed farther from the liner so that a thickness of the hoop layers decreases as a distance from the linear increases.

The layer of the composite layer disposed closest to the liner is a hoop layer.

The layer of the composite layer disposed farthest from the liner is a hoop layer.

The hoop layer is disposed on the cylinder part only in regions that are laterally alongside the axial direction of the high-pressure container.

The hoop layers decrease in length, as measured along the axial direction of the high-pressure container, with increased distance from the liner.

The ends of a hoop layer are pressed by the helical layer winding at the exterior of the hoop layer.

The hoop layer disposed closest to the liner and having the greatest thickness from among the hoop layers has a thickness tantamount to 10% to 35% of the total thickness of the hoop layers.

The hoop layers are wound around the perimeter of the liner at an angle of 88 to 89 degrees with respect to the axial direction of the high-pressure container.

The helical layers are wound around the perimeter of the liner at an angle of 5 to 44 degrees with respect to the axial direction of the high-pressure container.

The helical layers disposed on the cylinder part have constant thicknesses.

Based on the above, certain embodiments of the present disclosure provide the following advantages.

According to the embodiment of the present disclosure, the composite layer at the perimeter of the liner in a high-pressure container may be made more durable against stresses applied from various different directions.

Further, according to the embodiment of the present disclosure, the amount of composite material needed for reinforcing the perimeter of the liner in the high-pressure container may be reduced. Thus, the composite layer may be provided in a lighter weight.

In addition, according to the embodiment of the present disclosure, the hoop layers and helical layers are wound alternately, so that air pockets (gaps) that may occur between a hoop layer and the liner or between a hoop layer and a helical layer at the end portions of the hoop layer may be pressed down and removed, and any empty spaces within the composite layer may be avoided.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Certain embodiments of the present disclosure are described below in more detail with reference to the accompanying drawings. The embodiments of the present disclosure can be altered to various forms, and the scope of the present disclosure is not to be interpreted as being limited to the embodiments below. The embodiments are disclosed merely to provide a more complete understanding of the present disclosure to those having ordinary skill in the art.

Terms such as "part", "unit", "module", etc., used in the specification refer to a unit component that processes at least one function or operation, where such component can be implemented in hardware or software form or as a combination of hardware and software forms.

A fuel cell system mounted in a vehicle is mainly composed of a fuel cell stack that generates electrical energy, a fuel supply device that supplies fuel (hydrogen) to the fuel cell stack, an air supply device that supplies oxygen from the air to the fuel cell stack as a oxidant needed for the electrochemical reactions, a cooling system that removes the heat from the reactions of the fuel cell stack to the exterior system and controls the operating temperature of the fuel cell stack, and the like.

In the fuel supply of the fuel cell system, a high-pressure container provided with fuel may exist in the form of a fuel storage tank. In a high-pressure container, hydrogen may be provided and used as fuel, and hydrogen gas under a high pressure of about 700 bars may be stored inside the container. Thus, a high pressure state due to the fuel or hydrogen may continue within the high-pressure container, applying pressure on the high-pressure container. In particular, if a leak or a rupture occurs at a position on the high-pressure container, the high pressure inside may be concentrated at said position, possibly causing damage to the high-pressure container and resulting in an explosion, etc. Therefore, the durability and safety of the high-pressure container are of great importance in a fuel cell system and in a vehicle that may be mounted with a fuel cell system.

In order that high-pressure fuel, e.g., hydrogen, may be stored in a high-pressure container in a stable manner, the high-pressure container may be formed to include a liner, more specifically a liner of a plastic material, and a boss part that is faulted at one end of the liner and includes a nozzle through which fuel may be injected or discharged. Furthermore, the recent trend is to use a Type 4 high-pressure container, which includes not only the structure of the liner and boss part coupled together, but also a composite layer formed over said structure, where the composite layer is formed by winding the exterior of the structure with a carbon-fiber composite material.

Figure 1:
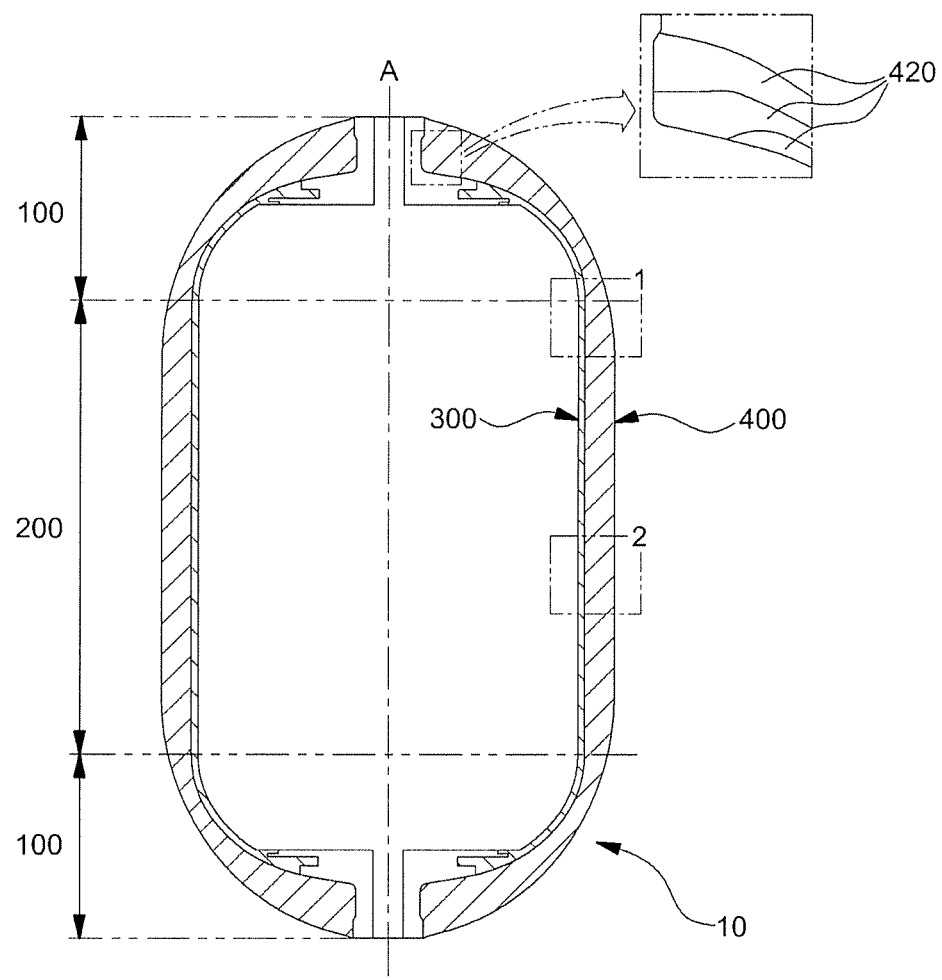
FIG. 1 illustrates a high-pressure container according to an embodiment of the present disclosure, showing the structure of the high-pressure container and showing only helical layers formed at dome parts of the high-pressure container.

In the present specification, the dashed line marked 'A' in FIG. 1 is referred to as the 'axis of the high-pressure container' or the 'central axis of the high-pressure container', in describing the embodiments of the present disclosure. That is, line 'A' is a line drawn along the axial direction of the high-pressure container, and the axis of the high-pressure container may hereinafter refer to the line marked 'A'.

Considering the detailed composition of the composite layer 400 wound around the perimeter of the liner 300 in a high-pressure container 10 with reference to FIG. 1, the composite layer 400 may be composed of helical layers 420, tube helical layers, and hoop layers 410.

Here, the helical layers 420, tube helical layers, and hoop layers 410 may be differentiated by the angles with respect to the axis of the high-pressure container 10 at which they are wound around the high-pressure container 10, specifically the perimeter of the liner 300, where helical layers 420 are wound at low angles, in a certain embodiment, 5 to 44 degrees, tube helical layers are wound at medium angles, in a certain embodiment 45 to 87 degrees, and hoop layers 410 are wound at high angles, in a certain embodiment, 88 to 89 degrees, with respect to the central axis (line A) of the high-pressure container 10.

The composite material wound around the perimeter of the liner 300 is a continuous fiber material having a particular width. The material may be prepared before the winding and may be wound around the perimeter of the liner 300 in set angles. More specifically, the liner 300 injection-molded beforehand may remain secured, while a winding device may move to form a particular angle with respect to the liner 300 and then wind the continuous composite fiber material of a particular width around the perimeter of the liner 300 with a particular level of tension to form the composite layer 400. That is, composite layer 400 may be formed by overlapping the composite material in several layers, with the first layer wound around the perimeter of the liner 300 formed touching the perimeter of the liner 300.

FIG. 1 provides a simplified view illustrating the shape of such Type 4 high-pressure container 10. Referring to FIG. 1, the high-pressure container 10 may include a cylinder part 200 that extends in a cylindrical shape at the center of the high-pressure container 10 and forms the body of the high-pressure container 10 and dome parts 100 that are formed in a semispherical shape at both ends of the cylinder part 200 and are fastened to the cylinder part 200 to form the high-pressure container 10 together with the cylinder part. That is, a cross section of the cylinder part 200 of the high-pressure container 10 along the axial direction A may form straight lines without any curvature along the axial direction A of the high-pressure container 10. However, in regard to its 3-dimensional shape, the cylinder part 200 may have a surface that is curved along the circumferential direction of the high-pressure container 10. In contrast, the dome parts 100 of the high-pressure container 10 may have surfaces that are curved along both the axial direction A and the circumferential direction of the high-pressure container 10.

Considering the magnified portion of a dome part 100 shown in FIG. 1, it can be seen that the dome part 100 formed around the nozzle of the high-pressure container 10 and/or the dome part 100 formed opposite the nozzle of the high-pressure container 10 is formed only with helical layers 420.

Generally, since the inside of the high-pressure container 10 is filled with fuel, e.g., a gas, of a high pressure, the high-pressure container 10 is subject to stresses applied in radial directions. Thus, each point of the liner 300 receives a force moving in a radial direction from the center point of the high-pressure container 10, and therefore it can be seen that, at the dome parts 100 of the high-pressure container 10, winding the composite material at low angles with respect to the axial direction A of the high-pressure container 10 provides the structure that best withstands forces applied in radial directions.

Similarly, at the cylinder part 200 of the high-pressure container 10, the pressure inside may be applied in radial directions from the center point of the high-pressure container 10, that is, along the circumferential direction of the cylinder part 200. Therefore, it can be seen that winding the composite material of a particular width along a direction perpendicular to the axial direction A of the high-pressure container 10 provides a structure that best withstands the pressure applied on the liner 300 and the high-pressure container 10.

Here, although the stresses are applied in radial directions from the center point of the high-pressure container 10, from the perspective of material mechanics, the stress applied in the circumferential direction at the cylinder part 200 of the high-pressure container 10, i.e. a direction perpendicular to the axial direction A of the high-pressure container 10, may be equal to or greater than twice the stress applied in the axial direction A of the high-pressure container 10. Therefore, at the cylinder part 200, the hoop layers 410, which are wound at angles nearly perpendicular to the axial direction A of the high-pressure container 10, bear the stresses applied in the circumferential direction of the high-pressure container 10 at the cylinder part 200.

Thus, an embodiment of the present disclosure aims to include the helical layers 420 and hoop layers 410 in the composite layer 400 wound around the cylinder part 200 in such a way that the composite layer 400 of the cylinder part 200 has a minimum thickness and hence a light weight while still being capable of withstanding the stresses applied in the circumferential direction of the high-pressure container 10 at the cylinder part 200. The structure of a high-pressure container 10 having a composite layer 400 comprising helical layers 420 and hoop layers 410 is described below in more detail as an exemplary embodiment of the present disclosure.

Figure 2:
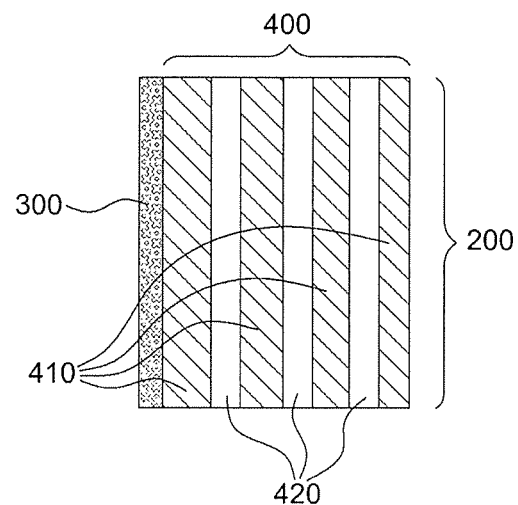
FIG. 2 illustrates an exemplary embodiment of the present disclosure, showing a magnified view of area '2' in FIG. 1, that is, the structure of a liner and composite layer at a cylinder part.

FIG. 2 is a magnified view of the cross section at part '2' in FIG. 1. In FIG. 2, the liner 300 may be arranged at the innermost side of the high-pressure container 10, i.e. on the left side in the drawing. Regarding the composition of the composite layer 400 famed on the exterior of the liner 300, it can be seen that multiple numbers of hoop layers 410 and helical layers 420 are alternately overlapped to form the composite layer 400. Thus, in an exemplary embodiment of the present disclosure, the composite layer 400 famed on the exterior of the liner 300 at the cylinder part 200 of the high-pressure container 10 may be formed by an overlapping of hoop layers 410 and helical layers 420.

As the composite layer 400 is formed at the cylinder part 200 of the high-pressure container 10 by alternately layering the hoop layers 410 and helical layers 420, the durability of the cylinder part 200 in the high-pressure container 10 may be increased with respect to stresses applied in various angles, compared to a composite layer 400 that is wound in one angle only.

Referring again to FIG. 2, in an exemplary embodiment of the present disclosure, the layer within the composite layer 400 formed closest to the liner 300 and/or the layer formed farthest from the liner 300 may be a hoop layer 410.

Referring to FIG. 2, an exemplary embodiment of the present disclosure may have the thickest hoop layer 410 within the composite layer 400 arranged closest to the liner 300. Furthermore, the thicknesses of the hoop layers 410 may be sequentially decreased with increased distance from the liner 300, so that the hoop layer 410 formed farthest from the liner 300 may have the smallest thickness. That is, when the hoop layers 410 adjacent to any one helical layer 420 are compared, the thickness of the hoop layer 410 formed closer to the liner 300 may be greater than the thickness of the hoop layer 410 famed further from the liner 300.

The reason for arranging the hoop layers 410 in this manner in an embodiment of the present disclosure may be explained with reference to FIGS. 3 and 4. The numerals shown in FIGS. 3 to 5 and mentioned below may be values converted into standard strength (normalized strength) and may be non-dimensional values representing the relative strength relationships between members.

Figure 3:
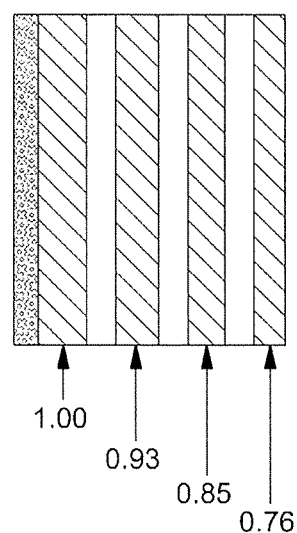
FIG. 3 illustrates the magnitudes of stresses applied on hoop layers in FIG. 2, according to the position of each hoop layer.

FIG. 3 illustrates the distribution of stress according to the positions of the hoop layers 410 in an embodiment of the present disclosure. From FIG. 3, it can be seen that the closer a hoop layer 410 is to the liner 300, i.e. the more inwardly the hoop layer 410 is positioned, the greater the stress applied. A greater amount of applied stress may mean that the corresponding point within the composite layer 400 bears a greater load (pressure applied by the fuel, gas, filled within the high-pressure container).

Figure 4:
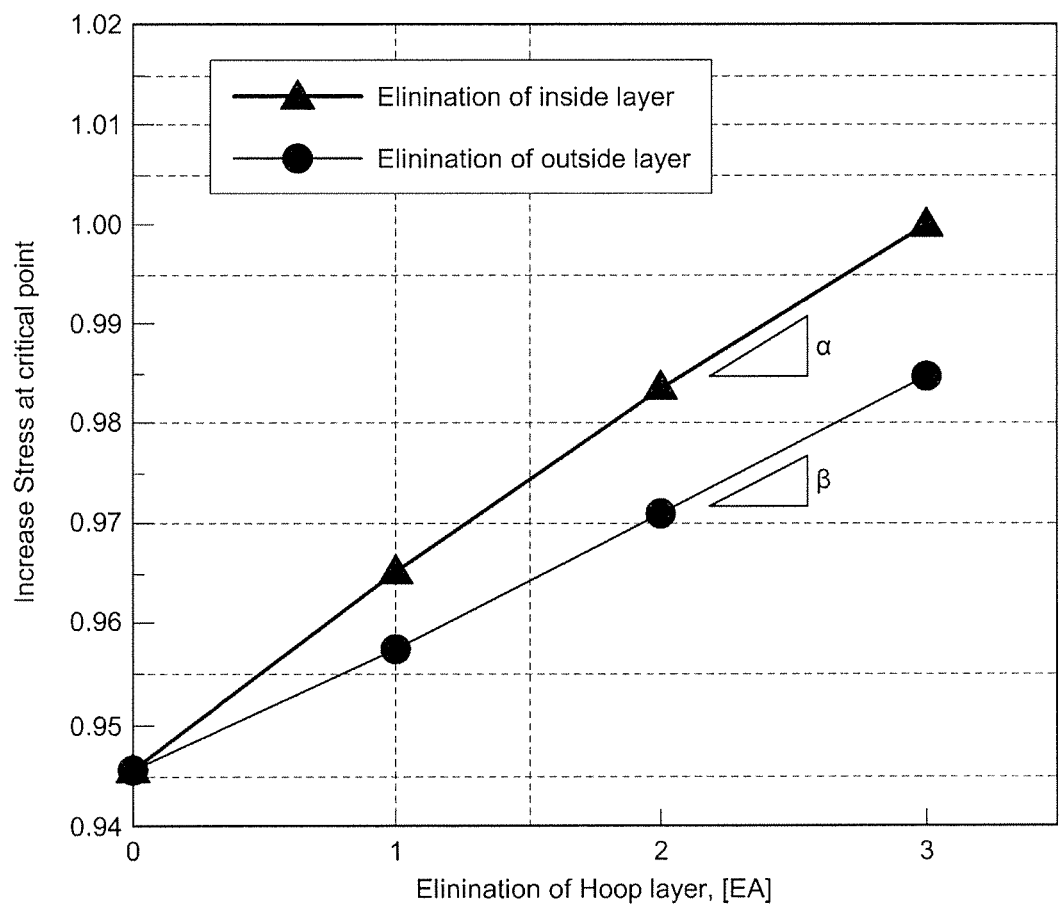
FIG. 4 is a graph representing stresses at the same position when hoop layers positioned relatively close to the liner and hoop layers positioned far from the liner are eliminated.

FIG. 4 is a graph representing increases in stress that occur at each position when hoop layers 410 are removed.

Referring to FIG. 4, it can be seen that a greater number of hoop layers 410 removed generally translates to a greater increase in stress at the measured position (critical point). When the cases of removing just one hoop layer 410 are compared, it can be seen that the degree of increase in stress (slope α) resulting from removing the hoop layer 410 arranged close to the liner 300 is greater than the degree of increase in stress (slope β) resulting from removing the hoop layer 410 arranged far from the liner 300. Furthermore, it can be seen that removing the hoop layers 410 on the inside, the layers arranged relatively closer to the liner 300, results in a larger increase in stress at the measured position (critical point) compared to removing the hoop layers 410 on the outside, the layers arranged relatively further from the liner 300. It can be observed from this graph that, from among the multiple number of hoop layers 410, the ones closer to the liner 300 bear more of the stresses.

The helical layers 420 wound around the cylinder part 200 of the high-pressure container 10 may serve to bear stresses in various directions. Furthermore, considering the manner in which the helical layers 420 are wound, since the helical layers 420 are wound around the center point of the high-pressure container along the perimeter of the liner, it is impossible for a helical layer 420 to wind around and cover the dome part without passing across the cylinder part. Thus, the helical layers 420 are layers that are unavoidably wound around the cylinder part.

However, as described above, the stresses of large magnitude applied in the circumferential direction in the liner 300 of the high-pressure container 10 may be supported and retained mostly by the hoop layers 410. Thus, according to an embodiment of the present disclosure, the plurality of helical layers 420 wound around the cylinder part 200 may be formed with uniform thicknesses.

Figure 5:
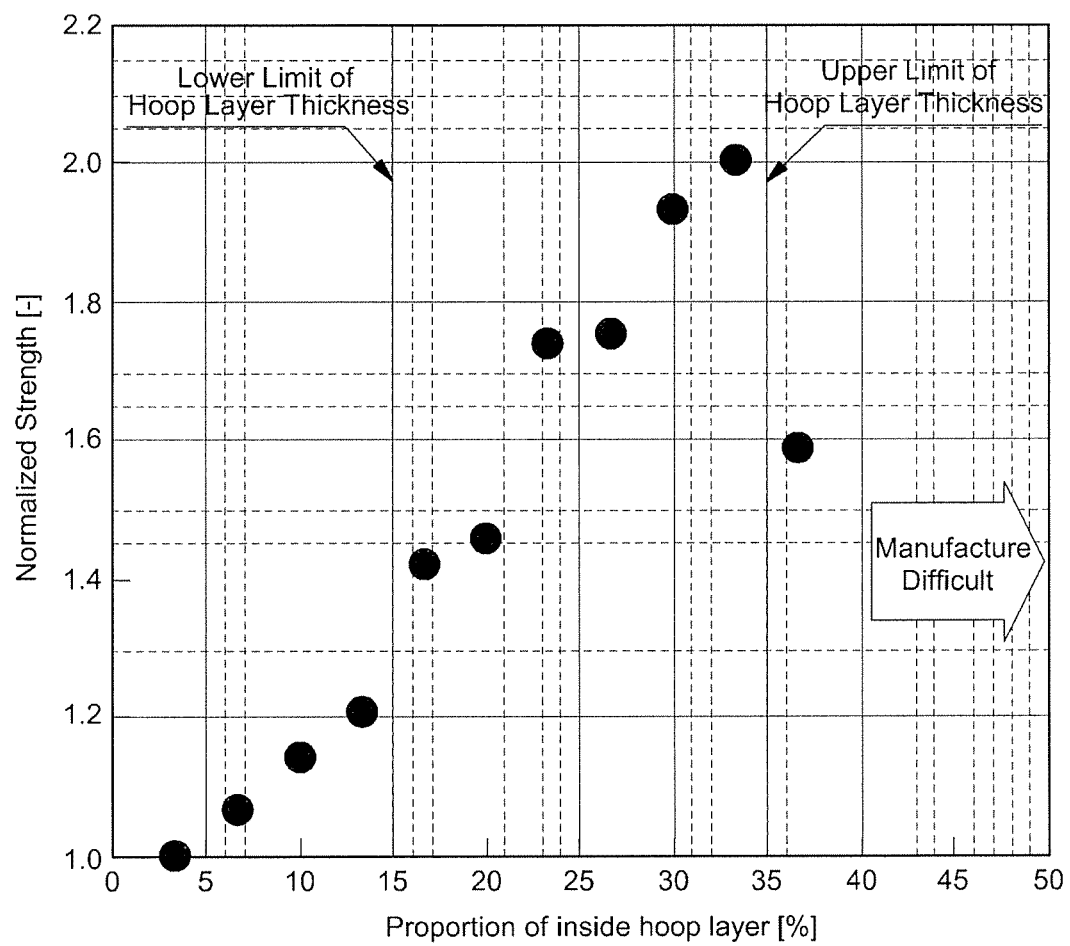
FIG. 5 is a graph representing changes in the strength of a high-pressure container according to the thickness proportion of the hoop layer positioned closest to the liner.

FIG. 5 is a graph representing changes in the strength of the high-pressure container 10 according to the proportion of the total thickness of the hoop layers 410 occupied by the thickness of the hoop layer 410 formed closest to the liner 300. With reference to FIG. 5, an embodiment of the present disclosure may have the thickest hoop layer 410, i.e. the hoop layer 410 formed closest to the liner 300, formed with a thickness corresponding to 35% or less of the overall thickness of the hoop layers 410. The hoop layer 410 formed closest to the liner 300 may be formed with a thickness between 10% and 35% of the total thickness of the hoop layers 410.

First, it can be seen from FIG. 5 that, within a certain region, an increase in the proportion of the total thickness of the hoop layers 410 occupied by the thickness of the innermost hoop layer 410 formed closest to the liner 300 translates to an increase in the strength of the high-pressure container 10.

However, as noted in FIG. 5, if the thickness of the innermost hoop layer 410 formed closest to the liner 300 exceeds 35% of the total thickness of the hoop layers 410, it would be difficult to wind a helical layer 420 over the hoop layer 410, making manufacture difficult. Even if such configuration were manufactured and a helical layer 420 were wound over the hoop layer 410, the thickness of the end portion of the hoop layer 410 at the end of the cylinder part 200 would create an air pocket between the hoop layer 410 and the helical layer 420, resulting in a decrease in the strength of the high-pressure container 10.

Providing below is a more detailed description of such air pockets caused by the thickness of a hoop layer 410. Since the hoop layers 410 are formed on the cylinder part 200, only on a portion of the cylinder part 200, whereas the helical layers 420 are formed across both the cylinder part 200 and the dome parts 100, an air pocket (air pocket layer) may be formed at the end portion of the hoop layer 410 between any one hoop layer 410 and the helical layer 420 layered over the hoop layer 410.

Figure 6:
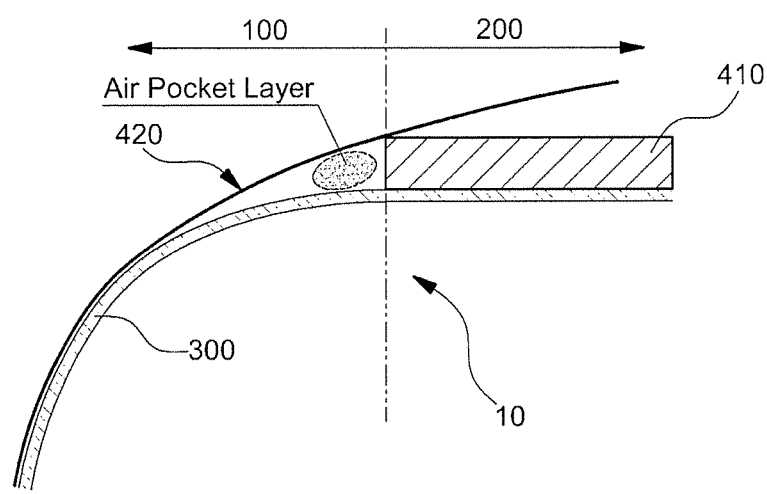
FIG. 6 illustrates the possibility of an air pocket or air pocket layer occurring at an end portion of a hoop layer when a helical layer is wound over the hoop layer.

FIG. 6 is provided as an illustration of the situation described above, and for convenience, the position where an air pocket may occur between the hoop layer 410 formed closest to the liner 300 and the helical layer 420 overlapping said hoop layer 410 is shown. Referring to FIG. 6, when a helical layer 420 is wound over a hoop layer 410 formed on the cylinder part 200 at an area where the cylinder part 200 and the dome part 100 are connected, the thickness of the cross section of the hoop layer 410 may create an air pocket at the end of the hoop layer 410. If an air pocket is created, this may lower the strength of the high-pressure container 10.

Figure 7:
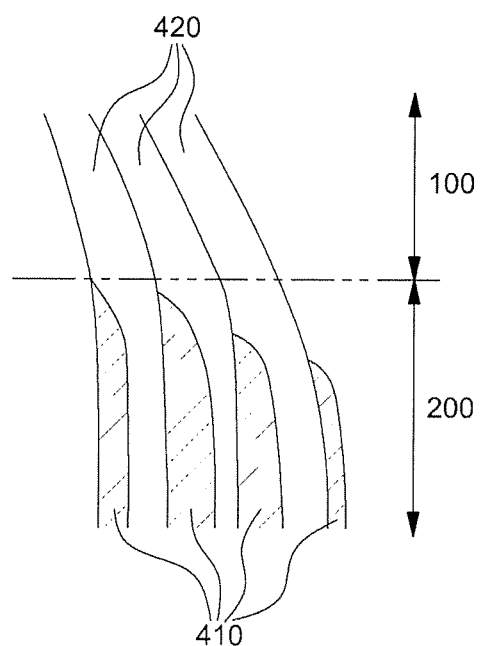
FIG. 7 illustrates an exemplary embodiment of the present disclosure, showing a magnified view of area '1' in FIG. 1, that is, the area where the dome part and the cylinder part are connected.

FIG. 7 is a magnified view of area '1' in FIG. 1. Area '1' of FIG. 1 may be an area where the cylinder part 200 and the dome part 100 of the high-pressure container 10 are connected to each other. Referring to FIG. 7, in the cross section of the high-pressure container 10, the hoop layers 410 may be formed laterally alongside the axial direction A of the high-pressure container 10, only in areas that are famed parallel to the axial direction A of the high-pressure container 10.

Referring to FIG. 7, when multiple numbers of hoop layers 410 and helical layers 420 are layered repeatedly, the area formed laterally alongside the axial direction A of the high-pressure container 10 on the cylinder part 200, i.e. the area having no curvature with respect to the axial direction A of the high-pressure container 10, may gradually decrease as the distance from the liner 300 increases, due to the hoop layers 410 and helical layers 420 already layered underneath.

According to an embodiment of the present disclosure, the hoop layers 410, as a rule, may be wound over the perimeter of the cylinder part 200 of the high-pressure container 10. However, the hoop layers 410 may be formed only on the perimeter of the cylinder part 200 formed laterally alongside the axial direction A of the high-pressure container 10, i.e. the area having no curvature with respect to the axial direction A of the high-pressure container 10, as seen in a cross section of the high-pressure container 10. Thus, the length of the plurality of hoop layers 410 measured along the axial direction A of the high-pressure container 10 may decrease with increasing distance from the liner 300.

In short, a key feature of the present disclosure is that the composite layer formed on the perimeter of the liner, at the cylinder part of the high-pressure container, includes hoop layers that are wound at high angles and helical layers that are wound at low angles, with the hoop layers and helical layers overlapped alternately. In particular, for any one helical layer, the hoop layers above and under the helical layer are formed such that the hoop layer famed closer to the liner has a greater thickness than that of the hoop layer formed further away from the liner.

While certain embodiments of the present disclosure are disclosed and described above, it is to be appreciated that various modifications and alterations of the present disclosure may be implemented by a person having ordinary skill in the art, for example by supplementing, changing, omitting, or adding elements, without departing from the spirit of the present disclosure set forth in the scope of claims. Such modifications and alterations are encompassed within the scope of the present disclosure.

Moreover, in describing the embodiments of the present disclosure, certain detailed descriptions relating to known functions or elements were omitted if it is deemed that such descriptions may unnecessarily obscure the essence of the present disclosure. The terms used above were defined in consideration of the associated functions within the context of the embodiments of the present disclosure and may be used differently according to the intentions or traditions, etc., of the user or operator. Thus, the definitions of such terms should be made based on the overall content of the present specification. The detailed description of the present disclosure provided above is not intended to limit the present disclosure to the implementations disclosed above, and the scope of claims below is to be interpreted as encompassing various other implementations.

What is claimed is:

1. A high-pressure container having a liner and a composite layer for reinforcing a perimeter of the liner, the high-pressure container comprising:
    a cylinder part along an axial direction of the high-pressure container; and
    dome parts fastened to both ends of the cylinder part to enclose the high-pressure container,
    wherein the composite layer, which is disposed on the cylinder part, includes a plurality of hoop layers and helical layers overlapped alternately,
    wherein a hoop layer disposed closer to the liner has a thickness greater than that of a hoop layer disposed farther from the liner so that a thickness of the hoop layers decreases as a distance from the liner increases, and
    wherein a layer of the composite layer disposed closest to the liner is a hoop layer among the plurality of hoop layers.

2. The high-pressure container of claim 1, wherein a layer of the composite layer disposed farthest from the liner is a hoop layer among the plurality of hoop layers.

3. The high-pressure container of claim 1, wherein the plurality of hoop layers are disposed on the cylinder part laterally in the axial direction of the high-pressure container.

4. The high-pressure container of claim 1, wherein the plurality of hoop layers decrease in length, as measured along the axial direction of the high-pressure container, with increased distance from the liner.

5. The high-pressure container of claim 1, wherein an end of each of the plurality of hoop layers is pressed by the helical layers winding at an exterior of the plurality of hoop layers.

6. The high-pressure container of claim 1, wherein the hoop layer, among the plurality of hoop layers, disposed closest to the liner and having a greatest thickness from among the plurality of hoop layers has a thickness of 10% to 35% of a total thickness of the plurality of hoop layers.

7. The high-pressure container of claim 1, wherein the plurality of hoop layers are wound around the perimeter of the liner at an angle, of 88 to 89 degrees with respect to the axial direction of the high-pressure container.

8. The high-pressure container of claim 1, wherein the plurality of helical layers are wound around the perimeter of the liner at an angle of 5 to 44 degrees with respect to the axial direction of the high-pressure container.

9. The high-pressure container of claim 1, wherein the plurality of helical layers disposed on the cylinder part have a constant thickness.

* * * * *